United States Patent [19]

Booze et al.

[11] Patent Number: 5,053,258

[45] Date of Patent: Oct. 1, 1991

[54] LOW TEMPERATURE LAMELLAR ARTICLE STRETCHING

[75] Inventors: Jack D. Booze; Pallatheri M. Subramanian, both of Wilmington, Del.

[73] Assignee: E. I. du Pont de Nemours and Company, Wilmington, Del.

[21] Appl. No.: 560,496

[22] Filed: Jul. 20, 1990

Related U.S. Application Data

[63] Continuation of Ser. No. 428,428, Oct. 27, 1989, abandoned, which is a continuation of Ser. No. 310,039, Feb. 10, 1989, abandoned, which is a continuation of Ser. No. 196,844, May 19, 1988, abandoned, which is a continuation of Ser. No. 68,807, Jun. 30, 1987, abandoned, which is a continuation of Ser. No. 921,880, Oct. 20, 1986, abandoned, which is a continuation of Ser. No. 384,935, Jun. 4, 1982, abandoned, which is a continuation-in-part of Ser. No. 359,510, Feb. 18, 1982, abandoned.

[51] Int. Cl.$^5$ .................... B29C 55/00; B29D 22/00; B29K 77/00

[52] U.S. Cl. .................... 428/36.6; 264/171; 264/210.1; 264/290.2; 428/35.4; 428/35.7; 428/36.92; 428/475.5; 428/910; 525/179; 525/183; 525/184

[58] Field of Search ............. 264/171, 288.4, 290.2, 264/210.1; 428/35.4, 35.7, 36.92, 475.5, 910, 36.6; 525/179, 183, 184

[56] References Cited

U.S. PATENT DOCUMENTS

| | | | |
|---|---|---|---|
| 3,093,255 | 6/1963 | Mesrobian et al. | 215/1 |
| 3,373,222 | 3/1968 | Armstrong | 260/857 |
| 3,373,223 | 3/1968 | Armstrong | 260/857 |
| 3,373,224 | 3/1968 | Mesrobian et al. | 260/857 |
| 3,382,305 | 5/1968 | Breen | 264/171 |
| 3,435,093 | 3/1969 | Cope | 260/857 |
| 3,547,761 | 12/1970 | Rasmussen | 264/171 |
| 3,548,048 | 12/1970 | Hughes et al. | 264/171 |
| 3,637,906 | 1/1972 | Parathoën | 264/290.2 |
| 3,639,527 | 2/1972 | Brinkman et al. | 260/873 |
| 3,719,729 | 3/1973 | Parathoën et al. | 264/290.2 |
| 3,775,521 | 11/1973 | Yamamoto et al. | 264/290.2 |
| 3,843,479 | 10/1974 | Matsunami et al. | 264/290.2 |
| 3,857,754 | 12/1974 | Hirata et al. | 161/227 |
| 3,873,667 | 3/1975 | Preto et al. | 264/234 |
| 3,975,463 | 8/1976 | Hirata et al. | 260/897 |
| 4,182,457 | 1/1980 | Yamada et al. | 428/35 |
| 4,247,663 | 1/1981 | Yoshiga et al. | 264/288.4 |
| 4,309,465 | 1/1982 | Kornbaum | 428/35 |
| 4,410,482 | 10/1983 | Subramanian | 264/290.2 |
| 4,501,797 | 2/1985 | Super et al. | 264/288.4 |
| 4,501,798 | 2/1985 | Koschak et al. | 264/288.4 |
| 4,724,185 | 2/1988 | Shah | 264/288.4 |
| 4,753,700 | 6/1988 | Fant | 264/171 |

FOREIGN PATENT DOCUMENTS

| | | | |
|---|---|---|---|
| 232333 | 4/1959 | Australia | 264/290.2 |
| 0041747 | 12/1981 | European Pat. Off. | |
| 2746181 | 5/1978 | Fed. Rep. of Germany . | |
| 55-130743 | 10/1980 | Japan | 264/290.2 |
| 1075824 | 7/1967 | United Kingdom | 264/290.2 |

OTHER PUBLICATIONS

Encyclopedia of Polymer Science & Technology, vol. 2, pp. 339-345 (1965).

*Primary Examiner*—James C. Housel

[57] ABSTRACT

A laminar article of a base polyolefin, a condensation polymer incompatible with the base polyolefin and an alkylcarboxyl-substituted polyolefin is stretched 2 to 6 times its dimensions above a temperature at which a significant portion of the crystals of the base polyolefin have melted and below a temperature at which all of the crystals have melted.

6 Claims, No Drawings

LOW TEMPERATURE LAMELLAR ARTICLE STRETCHING

This application is a continuation of application Ser. No. 428,428 filed on Oct. 27, 1989, and now abandoned, which is a continuation of application Ser. No. 310,039 filed Feb. 10, 1989, and now abandoned, which is a continuation of application Ser. No. 196,844 filed May 19, 1988, and now abandoned, which is a continuation of application Ser. No. 068,807 filed June 30, 1987, and now abandoned, which is a continuation of application Ser. No. 921,880 filed Oct. 20, 1986 and now abandoned, which is a continuation of application Ser. No. 384,935 filed June 4, 1982, and now abandoned, which is a continuation-in-part of application Ser. No. 359,510 filed Mar. 18, 1982, and now abandoned.

BACKGROUND OF THE INVENTION

The subject invention relates to the improvement of fluid barrier properties of a laminar, heterogeneous blend of polyolefin and a condensation polymer incompatible with the polyolefin.

As detailed in U.S. Ser. No. 241,051 filed Mar. 4, 1981, which is now U.S. Pat. No. 4,410,482, granted Oct. 18, 1983, a process and product therefrom is known for manufacturing a laminar, shaped article of polymeric material comprising the steps of establishing a melted, heterogeneous blend of a base polyolefin, a condensation polymer incompatible with the base polyolefin, and an alkylcarboxyl-substituted polyolefin; and forming the melted blend by stretching a body of the melt and cooling the stretched body to below the melting point of the lowest melting polymer component. The fluid barrier properties of an article made thereby are reported to be superior to the fluid barrier properties of prior art articles formed from homogeneous blends of similar components.

SUMMARY OF THE INVENTION

The subject invention improves upon the fluid barrier properties of the articles disclosed in U.S. Ser. No. 241,051 by stretching said articles 2 to 6 times their original dimensions.

More specifically, the subject invention is a process for improving the fluid barrier properties of a laminar, shaped article of a base polyolefin, a condensation polymer incompatible with the base polyolefin, and an alkylcarboxyl-substituted polyolefin wherein the base polyolefin and the condensation polymer are present in the article as thin, substantially two dimensional, parallel and overlapping layers of material and the alkylcarboxyl-substituted polyolefin is present between the layers and adheres the layers together, comprising, uniaxially or multiaxially stretching the article 2 to 6 times its dimensions above a temperature at which a significant portion of the base polyolefin is in melt form and below a temperature at which all of the base polyolefin is in melt form.

DETAILED DESCRIPTION

The products to be stretched in accordance with the subject invention are fully detailed in U.S. Ser. No. 241,051. These products, generally, are laminar shaped articles made from a mixture of two incompatible polymers and one polymer which serves to adhere together laminar domains of the incompatible polymers. The products are made by mixing together particles of the polymers, heating the mixture to yield a heterogeneous melt of material, and forming the melt in a way which results in stretching the melt to yield an elongated discontinuous polymer phase.

In one embodiment, in accordance with U.S. Ser. No. 241,051, the polymer particles, in unmelted form, are mixed thoroughly so as to provide a statistically homogeneous distribution and care must be exercised to avoid substantial additional mixing after the polymers have been heated to a melt. In another embodiment, the polymer particles can be combined in softened or molten form so long as the combination of polymers maintains a heterogeneous character. The blend can, also, be established by combining the polymers at a temperature such that one of the polyolefin or the condensation polymer is not softened or molten and then heating the combination. The preparation of the product depends on establishing a melted heterogeneous blend of incompatible polymers so that, when the melt is stretched at temperatures above the melting point of the highest melting polymer component, such as by extrusion forces, one polymer is in the form of a continuous matrix phase and another polymer is in the form of a discontinuous distributed phase. The polymer comprising the discontinuous phase is present as a multitude of thin, substantially two dimensional, parallel and overlapping layers embedded in the continuous phase.

Also necessary for the preparation of the product of U.S. Ser. No. 241,051 is a polymer which adheres together adjacent layers or domains of the incompatible polymers. In view of its believed purpose, that polymer can be termed a compatibilizer; but the actual mechanism of its operation is not completely understood. It is believed that at least some of the compatibilizer is concentrated, in the laminar shaped article of this invention, between the adjacent layers of incompatible polymer joined partially with one layer and partially with an adjacent layer, thus adhering the layers together. Without the compatibilizer, shaped articles formed from heterogeneous melts of incompatible polymer have poor mechanical properties. For the purposes of this invention, "incompatible polymers" mean polymeric materials which have substantially no mutual miscibility in the melt form.

Although it is not required, it is preferred that the condensation polymer used be in particulate form; and it is desired that both the polyolefin and the condensation polymer should be mixed as particles. The particles should, as a general rule, be of a size such that the molten blend of incompatible polymers, when introduced to some melt stretching means, such as extrusion die lips or an injection mold, exhibits the heterogeneity necessary for production of the product of U.S. Ser. No. 241,051. When the particles, especially particles of the condensation polymer, are of too small a size, the melted blend, even though not excessively mixed, tends to function as a homogeneous composition because the domains of material making up the discontinuous polymer phase are so small. When the particles, especially particles of the condensation polymer, are of too large a size, the melted blend tends to form into shaped articles having a marbleized structure rather than a laminar structure—the large domains of the materials which would make up the discontinuous phase extending to opposite boundaries of the shaped articles and causing disruption of the material which would make up the continuous phase. The particles are preferably generally regular in shape, such as cubical or spherical or the like.

The particles may, however, be irregular; and they may have one dimension substantially greater than another dimension such as would be the case, for example, when flakes or fibers of material are used.

When each of the incompatible polymers is present as individual particles, the particles are generally of approximately the same size although such is not required. The compatibilizer can be provided by itself as individual particles or it can be mixed into, coated onto, or otherwise combined with some or all of one or both of the incompatible polymers.

In the product of U.S. Ser. No. 241,051, the thickness of the layers of material in the discontinuous phase is a function of the particle size combined with the degree of stretching in the forming step. The particle size of the polymer which will be the discontinuous phase is generally selected with a view toward resulting, after stretching the melt, in overlapping layers which can be from about 0.5 to 50 micrometers thick and perhaps, sometimes slightly thicker. As detailed below, when stretched in accordance with the subject invention, these layers reduce to between about 0.05 to 10.0 micrometers in thickness.

Mixing particles of polymers can be accomplished by any well-known means such as by means of a vee-blender or a tumble mixer or, on a larger scale, by means of a double-cone blender. Continuous mixing of the particles can be accomplished by any of several well-known methods. Of course, the particles can also be mixed by hand—the only requirement of the mixing being that any two statistical samplings of the mixture in a given mass of material should yield substantially the same composition. The mixing of the incompatible polymers can be accomplished by adding particles of the higher melting polymer to a melt of the lower melting polymer maintained at a temperature below the higher melting point. In that case, the melt is agitated to obtain an adequate mixture; and the mixture is, thus, ready for the heating step.

Once mixed, the incompatible polymers are heated to a temperature greater than the melting point of the highest melting polymer component. It is noted that the heating is conducted for the purpose of stretching the softened or melted blend. In the case of an incompatible polymer which exhibits no well-defined melting temperature, "melting temperature", as used here, refers to a temperature at least high enough that the polymers have been softened to the degree required to stretch each of the polymers in the blend. That heating results in a softened or melted, heterogeneous blend of materials and the heating must be conducted in a manner which avoids substantial additional mixing of the incompatible polymers because such mixing could cause a homogenization and combination of the melted particles and could result in a melt and a shaped article of homogeneous, unlayered, composition. The heating can be conducted by any of several well-known means and is usually conducted in an extruder. It has been learned that a single-screw extruder, for example, one of the type which is designed for material transport and not material mixing, can be used between the heating and forming steps without causing homogenization of the two phase incompatible polymer composition. Low shear and low mixing extruders of the kind normally used for polyvinyl chloride, acrylonitrile, or polyvinylidene chloride can be used if they are used in a way to melt and transport the materials and minimize mixing of the components. High shear and high mixing extruders of the kind normally used for nylon and polyethylene cannot, generally, be used.

In order to form the product of U.S. Ser. No. 241,051, the melt is stretched and then cooled, this stretching being an elongation of the two phase melt to cause a substantial change in the dimensions of the particles in the discontinuous phase. Stretching in the melt phase can be accomplished by any of several means, or by a combination of more than one such means. For example, the melt can be stretched by being squeezed between rollers or pressed between platens or extruded between die lips. Molding processes such as blow molding also cause stretching in accordance with this process. In the manufacture of containers as shaped articles, this stretching can be accomplished by a combination of extruding a blend of the heterogeneous melt to yield a container preform or parison followed by blow molding the melt parison into a finished container.

The stretching of U.S. Ser. No. 241,051 can be carried out in one direction or in perpendicular directions, at a temperature above the melting temperature of the highest melting polymer component. Whether the stretching is conducted in one direction or two, there should be an elongation of from 100 to 500 percent in at least one direction; and an elongation of from 100 to 300 percent is preferred. While the upper limit set out herein is not critical so long as the article does not rupture, the lower limit is critical insofar as inadequate stretching does not yield the improved barriers to fluid permeation which characterizes the invention of U.S. Ser. No. 241,051.

Stretching is followed by cooling to below the temperature of the melting point of the lowest melting component to solidify the shaped article. The cooling can be conducted by any desired means and at any convenient rate. In the case of stretching by blow molding, the mold is often chilled to cool the article; and, in the case of extruding a film, cooling can be accomplished by exposure to cool air or by contact with a quenching roll.

As to the proportions of the components for production of the U.S. Ser. No. 241,051 article, the incompatible condensation polymer which is to be a discontinuous phase in the shaped articles should be present in generally less than about 40 weight percent of the mixture. More specifically, it has been found that the incompatible condensation polymer should be present in more than about 5 weight percent and less than about 40 weight percent of the mixture and about 10 to 30 weight percent is preferred. In the case where polyester is the incompatible polymer, it has further been found that such can be present in amounts up to about 60 percent of the mixture. The polyolefin should be present in more than about 60 weight percent and less than about 95 weight percent of the mixture and 70 to 90 weight percent is preferred. The compatibilizer should be present in about 5 to 30 weight percent of the discontinuous phase and about 10 to 20 weight percent is preferred. Any of the components can be used to introduce inert fillers into the composition provided only that the fillers are not of a kind or in an amount which would interfere with formation of the layered construction or with the desired or required properties of the composition. Amounts of opacifiers, colorants, lubricants, stabilizers and the like which are ordinarily used in structural polymeric materials can be used herein. The amount of such filler is not included in the calculation of amounts of incompatible polymers and compatibilizers.

The polyolefins used in the composition of the U.S. Ser. No. 241,051 product include polyethylene, polypropylene, polybutylene, copolymers of those materials, and the like. Polyethylene is preferred and may be high, medium, or low density.

The condensation polymer, incompatible with the polyolefin, includes polyamides, polyesters such as polyethylene terephthalate and polybutylene terephthalate and polycarbonates. It is preferred that polyolefin and condensation polymer be chosen such that the melting point of the former is lower than that of the latter.

Polyamides and copolyamides are well known and are made by reacting carboxylic acids with primary amines under well-known conditions. Examples of carboxylic acids used in polyamide preparation are adipic acid, suberic acid, sebacic acid, azelaic acid, glutaric acid, pimelic acid, and the like. Examples of primary amines are tetramethylenediamine, pentamethylenediamine, hexamethylenediamine, octamethylenediamine, and the like. Exemplary polyamides include poly(pentamethylene adipamide), poly(hexamethylene adipamide), poly(hexamethylene sebacamide), polyamides obtained from lactams such as caprolactams and from amino acids such as 11-aminoundecanoic acid, and the like. Poly(hexamethylene adipamide) and polycaproamide are preferred.

Polyesters are well known and are made by reacting dibasic carboxylic acids with glycols under well-known conditions. Examples of carboxylic acids used in preparation of polyesters are terephthalic acid, isophthalic acid, and the like. Examples of glycols, ethylene glycol, butylene glycol, and other so-called polymethylene glycols having 2 to 10 methylene groups. Exemplary polyesters are poly(ethylene terephthalate), poly(butylene terephthalate), and the like. Poly(ethylene terephthalate) is preferred.

Polycarbonates are disclosed in the *Handbook of Common Polymers*, compiled by W. J. Roff and J. R. Scott, CRC Press, Cleveland, Ohio, U.S.A. (1971).

The alkylcarboxyl-substituted polyolefin compatibilizer is a polyolefin which has carboxylic moieties attached thereto, either on the polyolefin backbone itself or on side chains. By "carboxylic moiety" is meant carboxylic groups from the group consisting of acids, esters, anhydrides, and salts. Carboxylic salts are neutralized carboxylic acids and a compatibilizer which includes carboxylic salts as a carboxylic moiety also includes the carboxylic acid of that salt. Such compatibilizers are termed ionomeric polymers.

Compatibilizers can be prepared by direct synthesis or by grafting. An example of direct synthesis is the polymerization of an -olefin with an olefinic monomer having a carboxylic moiety; and an example of grafting is the addition of a monomer having a carboxylic moiety to a polyolefin backbone. In the compatibilizer made by grafting, the polyolefin is polyethylene or a copolymer of ethylene and at least one α-olefin of 3-8 carbon atoms such as propylene, and the like, or a copolymer including at least one α-olefin of 3-8 carbon atoms and a diolefin, such as 1,4-hexadiene, and the like. The polyolefin is reacted with an unsaturated carboxylic acid, anhydride, or ester monomer to obtain the grafted polymer. Representative eligible acids, anhydrides, and esters include: methacrylic acid; acrylic acid; ethacrylic acid; glycidyl methacrylate; 2-hydroxy ethylacrylate; 2-hydroxy ethyl methacrylate; diethyl maleate; monoethyl maleate; di-n-butyl maleate; maleic anhydride; maleic acid; fumaric acid; itaconic acid; monoesters of such dicarboxylic acids; dodecenyl succinic anhydride, 5-norbornene-2,3-anhydride, nadic anhydride (3,6-endomethylene-1,2,3,6-tetrahydrophthalic anhydride); and the like. Generally, the graft polymer will have from about 0.01 to about 20, preferably about 0.1 to about 10, and most preferably about 0.2 to about 5, weight percent graft monomer. Grafted polymers are described in greater detail in U.S. Pat. Nos. 4,026,967 and 3,953,655.

In the compatibilizer made by direct synthesis, the polymeric material is a copolymer of and α-olefin of 2-10 carbon atoms and an $\alpha,\beta$-ethylenically unsaturated carboxylic acid, ester, anhydride, or salt having 1 or 2 carboxylic moieties. The directly synthesized compatibilizer is made up of at least 75 mole percent of the olefin component and from about 0.2 to 25 mole percent of the carboxylic component.

Ionomeric compatibilizer is preferably made from directly synthesized compatibilizer and is preferably made up of about 90 to 99 mol percent olefin and about 1 to 10 mol percent $\alpha,\beta$-ethylenically unsaturated monomer having carboxylic moieties wherein the moieties are considered as acid equivalents and are neutralized with metal ions having valences of 1 to 3, inclusive, where the carboxylic acid equivalent is monocarboxylic and are neutralized with metal ions having a valence of 1 where the carboxylic acid equivalent is dicarboxylic. To control the degree of neutralization, metal ions are present in an amount sufficient to neutralize at least 10 percent of the carboxyl moieties. Representative eligible α-olefins and unsaturated carboxylic acid, anhydride, and ester monomers are those previously herein described. Ionomeric polymers are described in greater detail in U.S. Pat. No. 3,264,272.

The compatibilizer is generally about 0.5 to 3.0 weight percent carboxylic component.

In making shaped articles in accordance with U.S. Ser. No. 241,051, the polyolefin is generally taken to provide the continuous phase and is used in an amount of about 60 to 95 weight percent of the total composition while the incompatible condensation polymer is taken to provide the discontinuous phase and is used in an amount of about 5 to about 40 weight percent of the total composition. The alkylcarboxyl-substituted polyolefin is used in an amount of about 0.5 to 5 weight percent of the total composition and more can be used, if desired.

In accordance with the subject invention, the product of U.S. Ser. No. 241,051, as detailed above and exemplified below, is uniaxially or multiaxially stretched in any conventional manner about 2 to 6 times its dimensions above a temperature at which a significant portion of the crystals of the base polyolefin have melted and below a temperature at which all of the crystals have melted. Within this temperature range, the polymer matrix can be stretched without adversely affecting its morphology. This temperature range can also be expressed by reference to the conventional Differential Scanning Calorimetry (DSC) melting curve (heating rate of 10° C. per minute) for the particular base polyolefin employed. For example, the onset of this curve for a typical high density polyethylene is about 98° C., the termination about 135° C. Using this curve, it is theorized that a significant portion of the crystals in high density polyethylene have melted at about 115° C., and that all of the crystals have melted at the termination of this curve, i.e., about 135° C. Therefore, in order to stretch the articles of U.S. Ser. No. 241,051 two to six times their dimensions when high density polyethylene is employed as the base polyolefin, the articles must be at a temperature between about 115° C. and 135° C. When an attempt is made to stretch these articles at temperatures below this range, the article fractures.

As an example of the process of the subject invention, an article in film form produced in accordance with the process of U.S. Ser. No. 241,051 can be stretched transversly in a tenter frame apparatus and stretched in the machine direction using conventional stretch rolls. Alternatively, an injection molded product of U.S. Ser. No. 241,051 in the shape of a tubular preform as described in Example II below can be stretched multiaxially by reheat blow molding into containers such as bottles.

Surprisingly, as evidenced by use of an optical microscope with cross polarizers, the condensation polymer within the base polyolefin stretches during the process of the subject invention while maintaining the integrity of the article being stretched, i.e., no voids are evidenced after stretching. It is theorized that the ability to stretch the condensation polymer within the base polyolefin matrix, at a temperature well below the melting point of that condensation polymer, is a result of a structural interaction between the molecules of the polymer components. Regardless of the mechanism, the product of the process of the subject invention exhibits between about two and five fold improvement, per unit thickness, in fluid barrier properties over those products described in U.S. Ser. No. 241,051.

The subject invention will be more fully appreciated by reference to the Examples that follow.

EXAMPLE I

Polyolefin, polyamide, and compatibilizer were mixed to make a heterogeneous blend in accordance with U.S. Ser. No. 241,051 as follows:

The polyamide was prepared by condensing hexamethylenediamine, adipic acid, and caprolactam to obtain a composition of 77.5 weight parts of poly(hexamethylene adipamide) and 22.5 weight parts of polycaproamide. That polyamide exhibited a DSC melting point of about 225° C.

The polyolefin was a linear polyethylene having a density of 0.944 gram per cubic centimeter, a melt index of 0.24 g/10 min. as determined according to ASTM D-1238, a DSC melting point of about 135° C., and is commercially available from E. I. du Pont de Nemours and Company under the trademark designation "Alathon" PE 7810. Particles of the polyamide and the polyethylene were generally cubical and were about 3–4 millimeters on each side.

The alkylcarboxyl-substituted polyolefin compatibilizer was obtained by melt grafting fumaric acid onto polyethylene having a density of 0.958 gram per cubic centimeter and a melt index of about 10 g/10 min., as determined according to ASTM D-1238. The fumaric acid was grafted onto the polyethylene in an amount of about 0.9 weight percent based on the total weight of the polymer in accordance with the teaching of U.S. Pat. No. 4,026,967. Particles of the compatibilizer were generally cubical and were about 2–3 millimeters on a side. The material exhibited a DSC melting point of about 135° C.

The mixture included 82 weight percent polyolefin, 15 weight percent polyamide, and 3 weight percent compatibilizer and was tumbled in a drum to achieve complete, even, particle distribution.

A portion of the mixture was fed directly into an extruder such as that sold by Midland Ross of New Brunswick, N.J., U.S.A., identified as Model 1027 and equipped with a low mixing screw and a side-fed blown film die.

Film samples approximately 30 cm in circumference were blown using a 2.5 inch die at an extrusion temperature of 280° C. For control purposes, the fluid barrier properties of this film, not stretched in accordance with the process of the subject invention, were measured as follows:

Control film samples 1 and 2, 12.7 cm (5 inches) square were smoothed by pressing at 225° C. and 10.3 MPA (1500 psig) for 5 minutes in a hydraulic press with a 4 inch ram such as that sold by Pasadena Hydraulics, Incorporated of Pasadena, Calif., identified as Model P-204. These control samples were tested for toluene permeability using glass jars with open metal caps, such as those used for food canning, by recording the initial weight of the test jar, film, and added toluene and then measuring the weight loss of toluene at approximately 2 day intervals over an approximately 10 day test period. These film samples used were circular and measured 36.4 cm$^2$ (5.64 in$^2$) in area. In preparing these samples for permeation tests, the film was placed over the jar opening with an o-ring (about the same size as the jar cap) cut from 1.6 mm (1/16 in) thick neoprene rubber between it and the cap to insure a leak-proof seal. Permeation test results for these controls are tabulated below.

Unpressed square film samples approximately 25.8 cm$^2$ in area and 5.1 cm on a side were then biaxially stretched at about 125° C. on a film stretcher 3.5× by 3.5× with stretching in the machine and transverse directions taking place simultaneously. Film samples 1, 2 and 3 were tested for toluene permeability in the same manner described above for the control films. All tests were conducted at room temperature, 22° C. Weight loss results, as well as a normalized toluene permeation rate (NTPR), were calculated for all samples. The NTPR was determined using the formula $$NTPR = \frac{\text{Wt Loss (g/24 hrs)} \times \text{Film thickness (mils)} \times 1000}{5.64 \text{ in}^2}$$

where 5.64 in$^2$ represents the film surface area exposed to the toluene and the 1000 factor is used to put the loss of toluene on a conventional 1000 in$^2$ area basis.

TABLE

| Sample | Average Thickness mm | Total Weight Loss (g) | Test Hours | Weight Loss (g/24 Hrs) | NTPR |
|---|---|---|---|---|---|
| 1 | 0.013 | 1.61 | 305.5 | 0.13 | 10 |
| 2 | 0.013 | 1.82 | 305.2 | 0.14 | 12 |
| 3 | 0.013 | 1.54 | 305.5 | 0.12 | 11 |
| Control 1 | 0.254 | 0.21 | 233.0 | 0.022 | 39 |
| Control 2 | 0.254 | 0.14 | 233.0 | 0.014 | 25 |

EXAMPLE II

The composition used in this Example II included 82 weight percent linear polyethylene, 3 weight percent compatibilizer and 15 weight percent "nylon" 6/66 (22.5/77.5 weight percent), all as detailed in Example I.

From this composition, a shaped article of the product of U.S. Ser. No. 241,051 in the form of a tubular preform, closed at one end and open at the other with external threads on the open end, was injection molded in a 14-ounce (about 3.8 deciliters) HPM Corporation (Gilead, Ohio, U.S.A.) injection molding machine. The overall preform height was about 13.7 cm, the outside diameter was about 2.4 cm and the wall thickness was about 0.4 cm. In accordance with U.S. Ser. No. 241,051, low shear mixing conditions were obtained by using a general purpose screw and low screw speed. The injection molding was done at a melt temperature of about 250° C. The mold was maintained at a temperature of about 21° C. The injection time was 12 seconds and cooling time was 9 seconds. The injection and packing pressures were $12 \times 10^7$ Pa (17000 psi). Microscopic examination of a cross-section confirmed that the nylon was present in the form of lamellae due to the melt being stretched during the flow through the mold gate and mold cavity.

The preforms were threaded into a receiver mounted on a movable table. A piston-operated center rod moved up into the preform to contact the end of the preform and keep it from sagging during the reheat stage. The center rod also served as the means of introducing gas pressure to the interior of the preform during the expansion process. The extension feature of the center rod also served to provide some axial orientation.

After threading, the preform was moved to the heating position. In this position, a reciprocating electrical heater was used to heat the preform to the desired temperature. The holder in which the preform was mounted rotated whenever it was in front of the heater. Approximately 7 minutes were required for heating the preform.

As soon as the heating cycle was complete, the preform was moved to a position between mold platens designed to form a bottle of about 950 cc. An infrared pyrometer (Ircon, Inc., Niles, Ill.; Model CH34LC) was used to measure the surface temperature of the preform. The average temperature of the preform was probably somewhat lower than indicated surface temperature. A dwell time of about 20 to 90 seconds was provided to equilibrate the preform temperature. After the dwell time, the mold was closed and the preform was simultaneously subjected to axial force and gas ($N_2$) pressure to elongate and expand the preform. Bottles were produced by blowing at a surface temperature of about 128°–133° C., a blow time of about 8 seconds and a blow pressure of about $7 \times 10^5$ to $1 \times 10^6$ Pa (100–150 psig). After the stretch/blow molding cycle, the mold was opened and the bottle was allowed to cool. The result was a stretching of the preform 3.4 and 2.0 times its hoop and axial directions respectively. The average wall thickness of the bottle was about 0.2 mm (7.5 mils).

Barrier to permeation was measured by adding 200 cc of xylene to the bottle, sealing it, and measuring weight periodically over 1 to 2 weeks (at about 22° C.). Permeability was found to be about 0.7 g/day.

COMPARATIVE EXAMPLE

A pellet blend of same composition as Example I was made; however, the polyolefin used was linear polyethylene having a density of 0.963 g/cc, a melt index of 0.3 g/10 min as determined according to ASTM D-1238 and is commercially available from Phillips Chemical Co. as "MARLEX" EHM 6003.

The blend was fed to an extrusion blow molding machine (Rocheleau Die & Machine Co., Fitchburg, Mass.). Bottles of about 1 liter size were made by using low shear mixing (2:1 compression ratio screw). The die head was maintained at a temperature of about 245° C. By using above conditions, the product of U.S. Ser. No. 241,051 in the form of bottles was made. By adjusting machine parameters, bottles with various wall thickness were made and then xylene permeability determined as per Example II. The permeability of unstretched bottles having a wall thickness comparable to those of Example II was calculated to be about 3.0 g/day.

We claim:

1. A process for improving the fluid barrier properties of a laminar, shaped article of a polyethylene, a polyamide which is selected from the group consisting of poly(hexamethylene adipamide), polycaproamide and mixtures thereof, incompatible with the polyethylene, and an alkylcarboxyl-substituted polyolefin wherein the polyethylene and the polyamide have a melting point differential greater than 50° C. and wherein the polyethylene has a melting point lower than the melting point of the polyamide and is present in the article in the form of a continuous matrix phase and the polyamide is present in the article in the form of a discontinuous distribution of thin, substantially two-dimensional, parallel and overlapping layers and the alkylcarboxyl-substituted polyolefin is present between the matrix and the layers and adheres the matrix and the layers together, comprising simultaneous multiaxial stretching the article 2 to 6 times its dimensions at a temperature of about from 115° C. to 135° C.

2. The process of claim 1 wherein the polyamide is present in an amount equal to 10 to 20 weight percent based on composition.

3. The process of claim 1 wherein the alkylcarboxyl-substituted polyolefin is selected from the group consisting of polyolefins which have carboxylic moieties attached thereto, either on the polyolefin backbone itself or on side chains.

4. The product of the process of claim 1, 2 or 3.

5. The product of claim 4 in the form of a film.

6. The product of claim 4 in the form of a container.

* * * * *